United States Patent

Kaneko et al.

[11] Patent Number: 5,363,303
[45] Date of Patent: Nov. 8, 1994

[54] CONTROL SYSTEM FOR VEHICLE SAFETY DEVICE

[75] Inventors: Hideyuki Kaneko; Kunihiro Takeuchi, both of Saitama, Japan

[73] Assignee: Zexel Corporation, Tokyo, Japan

[21] Appl. No.: 215,962

[22] Filed: Mar. 18, 1994

Related U.S. Application Data

[63] Continuation of Ser. No. 841,574, Feb. 26, 1992, abandoned.

[30] Foreign Application Priority Data

Mar. 13, 1991 [JP] Japan ................... 3-072180

[51] Int. Cl.$^5$ ............................. B60R 21/32
[52] U.S. Cl. ................... 364/424.05; 364/424.01; 364/426.01; 364/424.03; 307/10.1; 307/9.1; 280/735; 180/282; 340/438; 340/436
[58] Field of Search .............. 364/424.05, 424.01, 364/426.05, 426.04, 426.01, 424.03; 307/10.1, 236, 121, 360, 9.1; 280/735, 734, 741; 340/436–438, 514, 429, 467, 457; 180/274, 281, 282, 286, 271

[56] References Cited

U.S. PATENT DOCUMENTS

| | | | |
|---|---|---|---|
| 4,836,024 | 6/1989 | Woehrl et al. | 73/514 |
| 4,873,452 | 10/1989 | Morota et al. | 307/10.1 |
| 4,950,914 | 8/1990 | Kurihara et al. | 307/10.1 |
| 5,085,464 | 2/1992 | Behr et al. | 280/735 |
| 5,146,104 | 9/1992 | Schumacher et al. | 307/10.1 |
| 5,181,011 | 1/1993 | Okano | 340/438 |
| 5,182,459 | 1/1993 | Okano et al. | 307/10.1 |

Primary Examiner—Kevin J. Teska
Assistant Examiner—Jacques Harold Louis-Jacques
Attorney, Agent, or Firm—Fish & Richardson

[57] ABSTRACT

A vehicle safety device control system includes a plurality of acceleration sensors. Test pulses are supplied to the plurality of acceleration sensors. In order to judge whether or not each acceleration sensor has failed each acceleration sensor is checked for whether or not it outputs a signal that corresponds to the test pulse. The signal from the failed acceleration sensor is not used when a determining if a collision has occurred; only the signals from the other acceleration sensors are used in this determination.

4 Claims, 5 Drawing Sheets

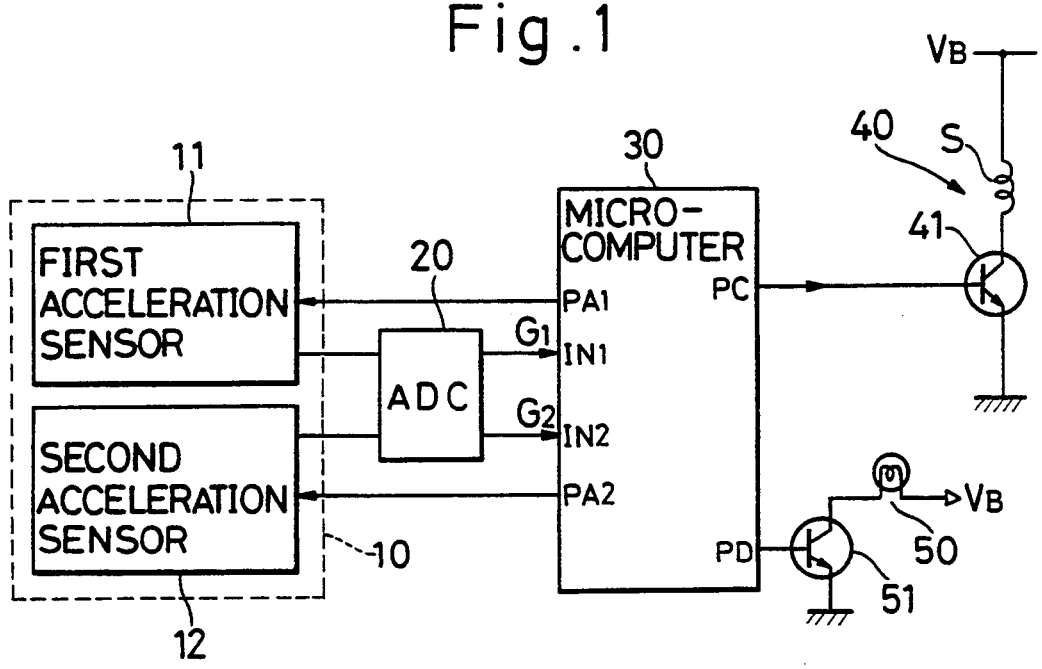
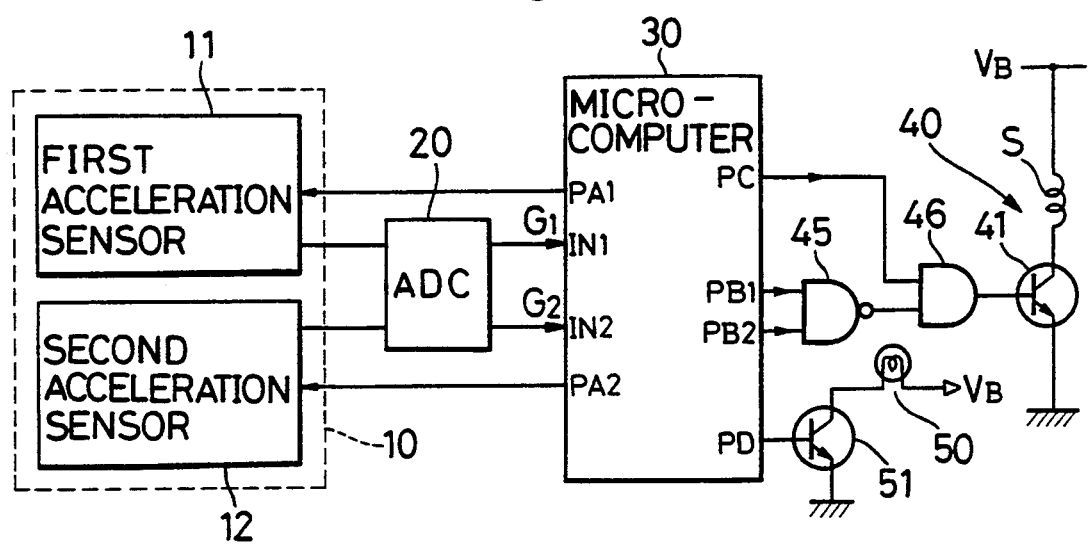

CONTROL SYSTEM FOR VEHICLE SAFETY DEVICE

This application is a continuation of U.S. application Ser. No. 07/841,574 filed Feb. 26, 1992, now abandoned.

BACKGROUND OF THE INVENTION

This invention relates to a control system for vehicle safety device such as an air bag.

As disclosed in U.S. Pat. No. 4,950,914, a control system for an air bag comprises a piezoelectric device (acceleration sensor), and acceleration evaluation means. signal (sensor signal) from the piezoelectric device represents the acceleration and deceleration of a vehicle. The acceleration evaluation means inputs the sensor signal at a predetermined cycle (i.e., at predetermined time intervals), and integrates it, and compares this integral value with a threshold level. This integral value represents a change in the vehicle speed, and increases in the deceleration direction during vehicle collision. When the integral value increases in the deceleration direction and exceeds the threshold level, the acceleration evaluation means judges that a collision has occurred, and outputs a trigger signal, to expand the air bag.

In the control system of the above U. S. Patent, failure or fault of the piezoelectric device can be judge. More specifically, the control system further comprises a test pulse output means for outputting test pulses to the piezoelectric device, and failure judgment means for checking an output level of the piezoelectric device responsive to the test pulse to judge whether or not the piezoelectric device has failed.

In the control system of the above U. S. Patent however, the failure judgment can be effected only when the vehicle is stopped because when a test pulse is supplied to the piezoelectric device, the piezoelectric device outputs a signal unrelated to the acceleration and deceleration of the vehicle. Therefore, the acceleration evaluation means cannot make a proper collision judgment.

Referring to other related art, U.S. Pat. No. 4,873,452 discloses a control system for a vehicle safety device having a failure judgment function for an acceleration sensor, which is similar to that disclosed in the first-mentioned U.S. Pat. U.S. Pat. No. 4,836,024 discloses a control system for a vehicle safety device which has two acceleration sensors, but does not have a failure Judgment function.

One of the inventors of the present invention is a coinventor of a U.S. patent application (Ser. No. 642,951) filed Jan. 18, 1991. This application discloses a technique in which test pulses are simultaneously supplied to two acceleration sensors, respectively, to effect the failure ,judgment of each of the two acceleration sensors.

SUMMARY OF THE INVENTION

It is an object of this invention to provide a control system which can effect the failure judgment of acceleration sensors during the running of a vehicle.

According to the present invention, a control system for a vehicle safety device comprising:

(a) a plurality of acceleration sensors each of which outputs a signal representative of acceleration and deceleration of a vehicle;

(b) test pulse output means for outputting test pulses in turn to the plurality of acceleration sensors;

(c) failure Judgment means for checking The signal, outputted from that acceleration sensor which has received the test pulse, so as to judge whether or not this acceleration sensor is subjected to a failure; and (d) acceleration evaluation means for effecting calculation in accordance with the signals, outputted respectively from those acceleration sensors which have not received the test pulse, so as to judge whether or not a collision of the vehicle has occurred, and then for outputting a trigger signal for the vehicle safety device when the acceleration evaluation means judges that the collision has occurred is provided.

BRIEF DESCRIPTION OF THE DRAWINGS

FIG. 1 is a circuit diagram schematically showing a control system according to the present invention;

FIG. 6 is a flow chart as in to FIG. 2 of a modified control system; and

DETAILED DESCRIPTION OF THE INVENTION

Figure 2:
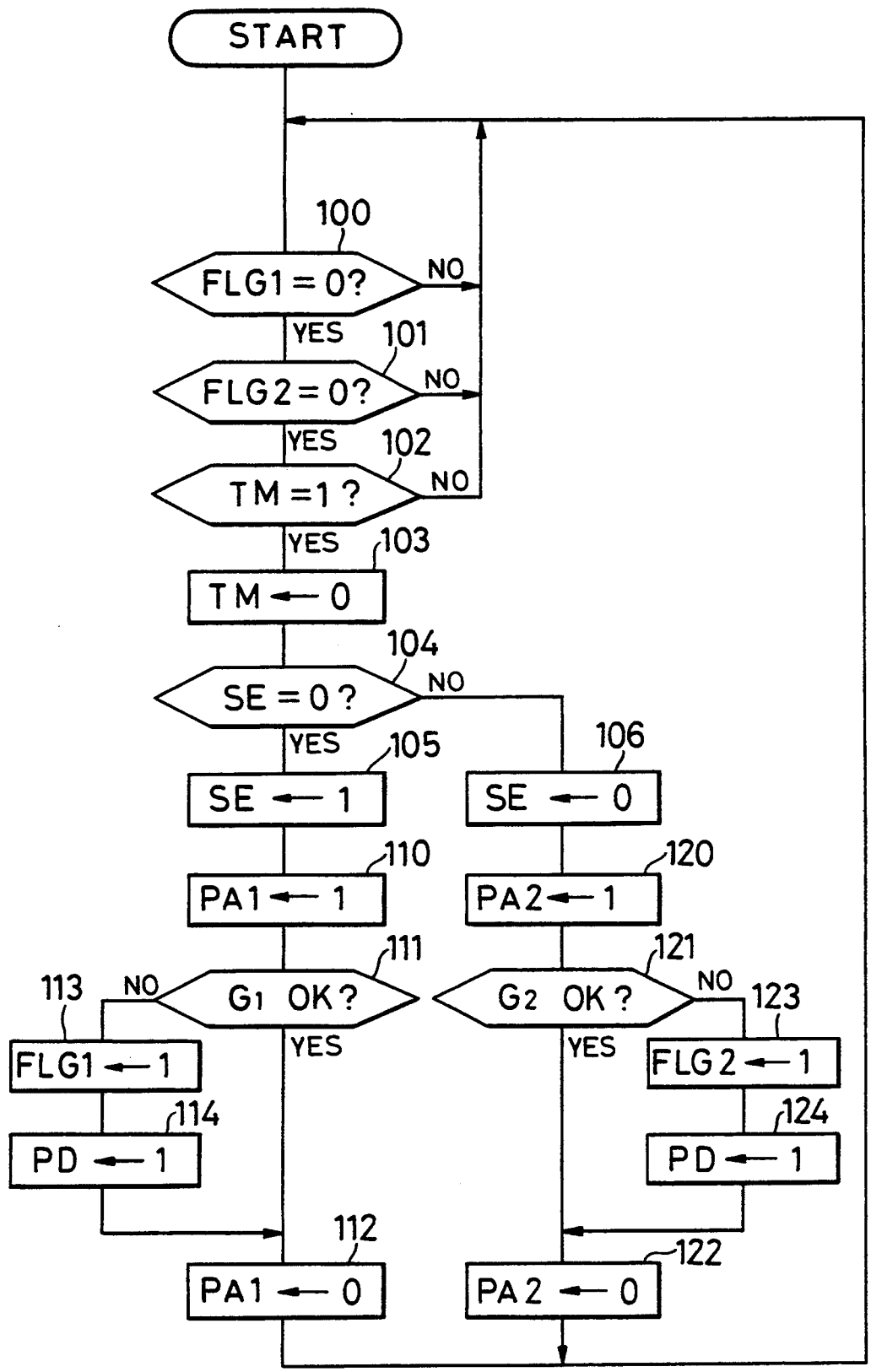
FIG. 2 is a flow chart of a failure judgment routine executed by a microcomputer of FIG. 1.

One preferred embodiment of the present invention will now be described with reference to FIGS. 1 to 5. FIG. .1 shows a general construction of a control system for controlling a squib S of an air bag (vehicle safety device). The control system comprises a pair of first and second acceleration sensors 11 and 12, each of which outputs a voltage signal representative of the acceleration and deceleration of a vehicle, an analog-to-digital converter (ADC) 20 for converting the voltage signals of the acceleration sensors 11 and 12 to digital signals, a microcomputer 30 for processing the digital signals from the ADC 20, and a drive circuit 40 for driving the squib S under the control of the microcomputer 30.

Each of the first and second acceleration sensors 11 and 12 comprises a piezoelectric device. The two sensors are fixedly mounted on a common base plate 10. The base plate 10 is fixedly mounted on a predetermined portion of the vehicle. Each of the acceleration sensors 11 and 12 has a first electrode and a second electrode on one side or face, and a ground electrode on the other side thereof. The acceleration sensor 11 (12) outputs, from the first electrode, a voltage signal corresponding to the acceleration or decelaration of the vehicle. For example, when the vehicle is decelerating the acceleration sensor 11 (12) outputs a voltage signal higher than the reference voltage, and when the vehicle is accelerating, the acceleration sensor 11 (12) outputs a voltage signal lower than the reference voltage. The first electrode of the acceleration sensor 11 (12) is connected to the ADC 20 via an amplifier circuit (not shown). Test pulses are supplied to the second electrode of the acceleration sensor 11 (12), as later described.

The microcomputer 30 comprises input ports IN1 and IN2, respectively, for receiving sensor signals $G_1$ and $G_2$, respectively fed from the acceleration sensors 11 and 12 via the ADC 20, output ports PA1 and PA2 for outputting test pulses, respectively, to the second electrodes of the acceleration sensors 11 and 12, an output port PC for outputting a trigger signal when It is judged that a collision has occurred, and an output port PD for outputting an alarm instruction signal when it is judged that either of the acceleration sensors 11 and 12 is subjected to a failure or fault.

The drive circuit 40 comprises an emitter-grounded transistor 41, and the squib S is connected between the collector of this transistor 41 and a battery $V_B$. The output port PC of the microcomputer 30 is connected to the base of the transistor 41. When the trigger signal of a high level is output from the output port PC of the microcomputer 30, the transistor 41 is turned on to ignite the squib S to expand the air bag.

The control system further comprises an alarm lamp 50. One end of the alarm lamp 50 is connected to the battery $V_B$, and the other end thereof is connected to a collector of an emitter-grounded transistor 51. When the alarm instruction signal of a high level is supplied to the base of the transistor 51 from the output port PD of the microcomputer 30, the alarm lamp 50 is turned on to tell the driver of a failure of the acceleration sensor 11 (12).

The microcomputer 30 judges in a main routine of FIG. whether or not each of the acceleration sensors 11 and 12 is subjected to a failure. Other programs in the main routine are not shown for the sake of simplicity of the drawings. Failure flags FLG1 and FLG2 represent failures of the acceleration sensors 11 and 12, respectively. First, it is judged whether or not the failure flag FLG1 is in a cleared (reset) condition (Step 100). If the judgment result is "YES", it is judged whether or not the failure flag FLG2 is in a cleared condition {Step 101). If the Judgment result of either Step 100 or Step 101 is "NO" (that is, it has been judged in the preceding cycle of the failure judgment program that one of the acceleration sensors 11 and 12 has been subjected to a failure), the following failure judgment will not be effected.

The judgment results in Steps 100 and 101 are both "YES" (that is, it is judged that both acceleration sensors 11 and 12 are normal), it is judged whether or not a flag TM is set (Step 102). The flag TM is set, for example, 15 minutes after it is cleared. If the judgment result in Step 102 is "NO". the failure Judgment is not effected. In contrast, if this judgment result is "YES", the flag TM is cleared (Step 103), and then the failure judgment from Step 104 on is effected. Therefore, the failure Judgment is effected every 15 minutes.

In Step 104, it is judged whether or not a flag SE is cleared. The flag SE indicates whether the acceleration sensor to be subjected to the failure Judgment at this time is the first acceleration sensor 11 or the second acceleration sensor 12. If it is judged in Step 104 that the flag SE is cleared, the flag SE is set so as to effect the failure Judgment of the second acceleration sensor 12 at the next cycle (Step 105), and then the failure judgment of the first acceleration sensor 11 as described later is effected. In contrast, if it is judged in Step 104 that the flag SE is set, the flag SE is cleared so as to effect the failure judgment of the first acceleration sensor 11 at the next cycle (Step 106), and then the failure Judgment of the second acceleration sensor 12 as described later is effected. By means of Steps 104, 105 and 106, the acceleration sensors 11 and 12 are alternately judged with respect to their failure.

The failure judgment of the first acceleration sensor 11 will now be described. After the above Step 105, the output of the output port PA1 is brought to a high level (Step 110). This means that the test pulse begins to be outputted. Then, it is judged whether or not the sensor signal $G_1$, fed from the first acceleration sensor 11 via the ADC 20, represents an output level corresponding to the test pulse (Step 111). If this judgment result is "YES" (that is, it is judged that the first acceleration sensor 11 is normal), the output of the output port PA1 is restored to a low level to stop the outputting of The test pulse (Step 112), and the failure judgment program is finished. If the Judgment result in Step 111 is "NO" (that is, it is judged that the first acceleration sensor 11 is subjected to a failure), the failure flag FLG1 is set (Step 113), and then the alarm instruction signal of a high level is outputted from the output port PD to turn on the alarm lamp 50 (Step 114), and then the program proceeds to Step 112 to stop the outputting of the test pulse.

Next, Steps 120 to 124 for the failure Judgment of the second acceleration sensor 12 to be executed after Step 106 will now be described. These Steps correspond to the above Steps 110 to 114, respectively, and therefore will be described briefly. First, the output of the output port PA2 is brought to a high level to start the outputting of the test pulse (Step 120), and it is judged whether or not the sensor signal $G_2$, fed from the second acceleration sensor 12 via the ADC 20, represents an output level corresponding to the test pulse (Step 121). If this Judgment result is "YES", the output of the output port PA2 is restored to a low level to stop the outputting of the test pulse (Step 122), and the failure Judgment program is finished. If the judgment result in Step 121 is "NO", the failure flag FLG2 is set (Step 123), and then the output of the output port PD is brought to a high level to turn on the alarm lamp 50 (Step 124), and then the program proceeds to the above Step 122.

The microcomputer 30 executes an acceleration evaluation routine (timer interrupt routine) (shown in FIG. 3) at a predetermined cycle. This routine is, of course, executed even during the running of the vehicle. First, The sensor signals $G_1$ and $G_2$, fed respectively from the acceleration sensors 11 and 12 via the ADC 20, are inputted (Step 200). Then, it is judged whether or not the failure flag FLG1 is in a cleared condition (Step 201). If this judgment result is "YES", it is judged whether or not the failure flag FLG2 is in a cleared condition (Step 202).

If the judgment result in Step 202 is "YES" (that is, it is judged that both of the acceleration sensors 11 and 12 are normal), a first integral value $\Delta V_1$, based on the sensor signal $G_1$ from the first acceleration sensor 11, is first calculated. More specifically, it is judged whether or not the output level of the output port PA1 is low (Step 203). If this judgment result is "YES" (that is, it is judged that the first acceleration sensor 11 is not in the process of undergoing the failure judgment), the sensor signal $G_1$ from the first acceleration sensor 11 is added to the first integral value $\Delta V_1$, calculated at the preceding cycle, to obtain the present first integral value $\Delta V_1$ (Step 204). If it is judged in the above Step 203 that the output level of the output port PA1 is high (that is, it is judged that the first acceleration sensor 11 is in the process of undergoing the failure judgment), the sensor signal $G_2$ from the second acceleration sensor 12, instead of the sensor signal $G_1$ from the first acceleration sensor 11, is added to the precedingly-obtained first integral value $\Delta V_1$ to obtain the present first integral value $\Delta V_1$ (Step 205).

Next, Steps 206 to 208 for obtaining a second integral value $\Delta V_2$ based on the sensor signal $G_2$ from the second acceleration sensor 12 will now be described. These Steps are similar to the above Steps 203 to 205, and therefore will be described briefly. It is judged whether or not the output level of the output port PA2 is low (Step 206). If this judgment result is "YES" (that is, it is judged that the second acceleration sensor 12 is not in the process of undergoing the failure judgment), the second integral value $\Delta V_2$ is calculated based on the sensor signal $G_2$ from the second acceleration sensor 12 (Step 207). If the judgment result in the above Step 206 is "NO" (that is, it is judged that the second acceleration sensor 12 is in the process of undergoing the failure judgment), the sensor signal $G_1$, instead of the sensor signal $G_2$, is added to the precedingly-obtained second integral value $\Delta V_2$ to obtain the present second integral value $\Delta V_2$ (Step 208).

Next, the collision judgment is effected based on the above integral values $\Delta V_1$ and $\Delta V_2$. More specifically, it is judged whether or not the first integral value $\Delta V_1$ exceeds a threshold level Th (Step 209), and if this judgment result is "YES", it is judged whether or not the second integral value $\Delta V_2$ exceeds the threshold level Th (Step 210). When the vehicle collision occurs, the integral values $\Delta V_1$ and $\Delta V_2$ increase in the decelerating direction to exceed the threshold level Th, so that the judgment results in Steps 209 and 210 are in the affirmative. In this case, the output of the output port PC is brought to a high level to output the trigger signal, so that the squib S is ignited to expand the air bag (Step 211). If the judgment result in either Step 209 or Step 210 is "NO", the program returns to the main routine without executing Step 211. Thus, when the failure flags FLG1 and FLG2 are in the cleared condition (that is, both of the acceleration sensors 11 and 12 are normal), the air bag is expanded only when both of the first and second integral values $\Delta V_1$ and $\Delta V_2$ exceed the threshold level Th.

Figure 4:
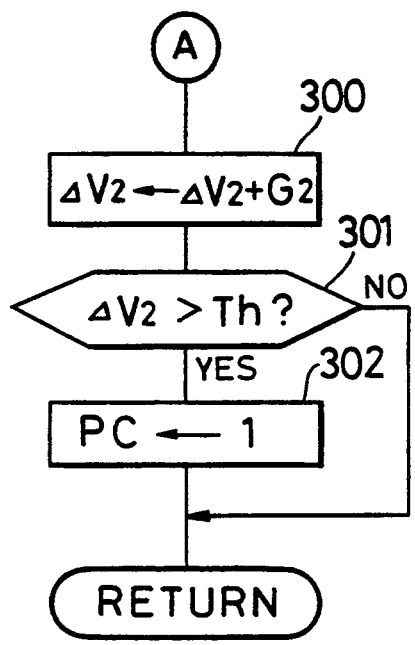
FIGS. 4 and 5 are flow charts showing a portion of the acceleration evaluation routine executed by the microcomputer.
Figure 5:
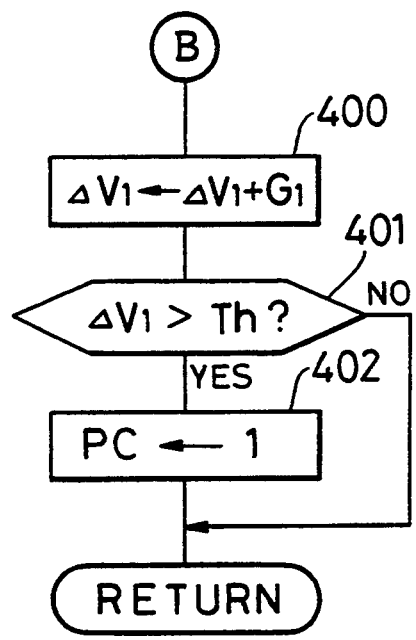

If the judgment result in Step 201 is "NO" (that is. it is judged that the first acceleration sensor 11 is subjected to a failure), the acceleration evaluation, based on the sensor signal $G_2$ from the second acceleration sensor 12, is effected as shown in FIG. 4. More specifically, the sensor signal $G_2$ is integrated to obtain the second integral value $\Delta V_2$ (Step 300), and it is Judged whether or not the second integral value $\Delta V_2$ exceeds the threshold level Th (Step 301), and if this ,judgment result is "YES", the output of the output port PC is brought to a high level, thereby expanding the air bag (Step 302).

If the Judgment result in Step 202 is "NO" (that is, it is Judged that the second acceleration sensor 12 is subjected to a failure), the first integral value $\Delta V_1$ is obtained based on the sensor signal $G_1$ from the first acceleration sensor 11 (Step 400). Then, it is judged whether or not the first integral value $\Delta V_1$ exceeds the threshold level Th (Step 401), and if this judgment result is "YES", the output of the output port PC is brought to a high level, thereby expanding the air bag (Step 402).

As described above, the test pulses are supplied alternately (i.e., in turn) to the plurality of acceleration sensors 11 and 12 to effect the failure judgment, and the signal from the acceleration sensor in the process of the failure judgment is not used for the acceleration evaluation, and the signal from the other acceleration sensor not in the process of the failure judgment is used for the acceleration evaluation. Therefore, even during the failure judgment, the acceleration evaluation can be effected accurately. In other words, during the running of the vehicle, the failure judgement of the acceleration sensors 11 and 12 can be effected while effecting the acceleration evaluation.

The present invention is not limited to the above embodiment, and various modifications can be made. For example, as shown in FIG. 6, the control system may further comprise NAND circuit 45 and AND circuit 46, and the microcomputer 30 may further include output ports PB1 and PB2. The outputs of the output ports PB1 and PB2 are supplied to two input terminals of the NAND circuit 45, respectively. The output of the output port PC of the microcomputer 30 and the output of the NAND circuit 45 are supplied to two input terminals of the AND circuit 46, respectively. The output of the AND circuit 46 is supplied to the base of the transistor 41. During the time when the failure judgment signals of a high level are outputted from both of The output ports PB1 and PB2, respectively, the output level of the NAND circuit 45 is low to close the AND circuit 46, so That The transistor 41 is maintained in the OFF state. Either during the time when the failure judgment signal is not outputted from both of the output ports PB1 and PB2, or during the time when the failure judgment signal is outputted from only one of these two output ports, the output of the NAND circuit 45 is high to open the AND circuit 46. In this condition, when the trigger signal of a high level is outputted from the output port PC, the output of the AND circuit 46 goes high to turn on the transistor 41 to ignite the squib S, thereby expanding the air bag. Those portions of FIG. 6 corresponding to those of FIG. 1 are designated by identical reference numerals, respectively, and explanation thereof is omitted.

Figure 3:
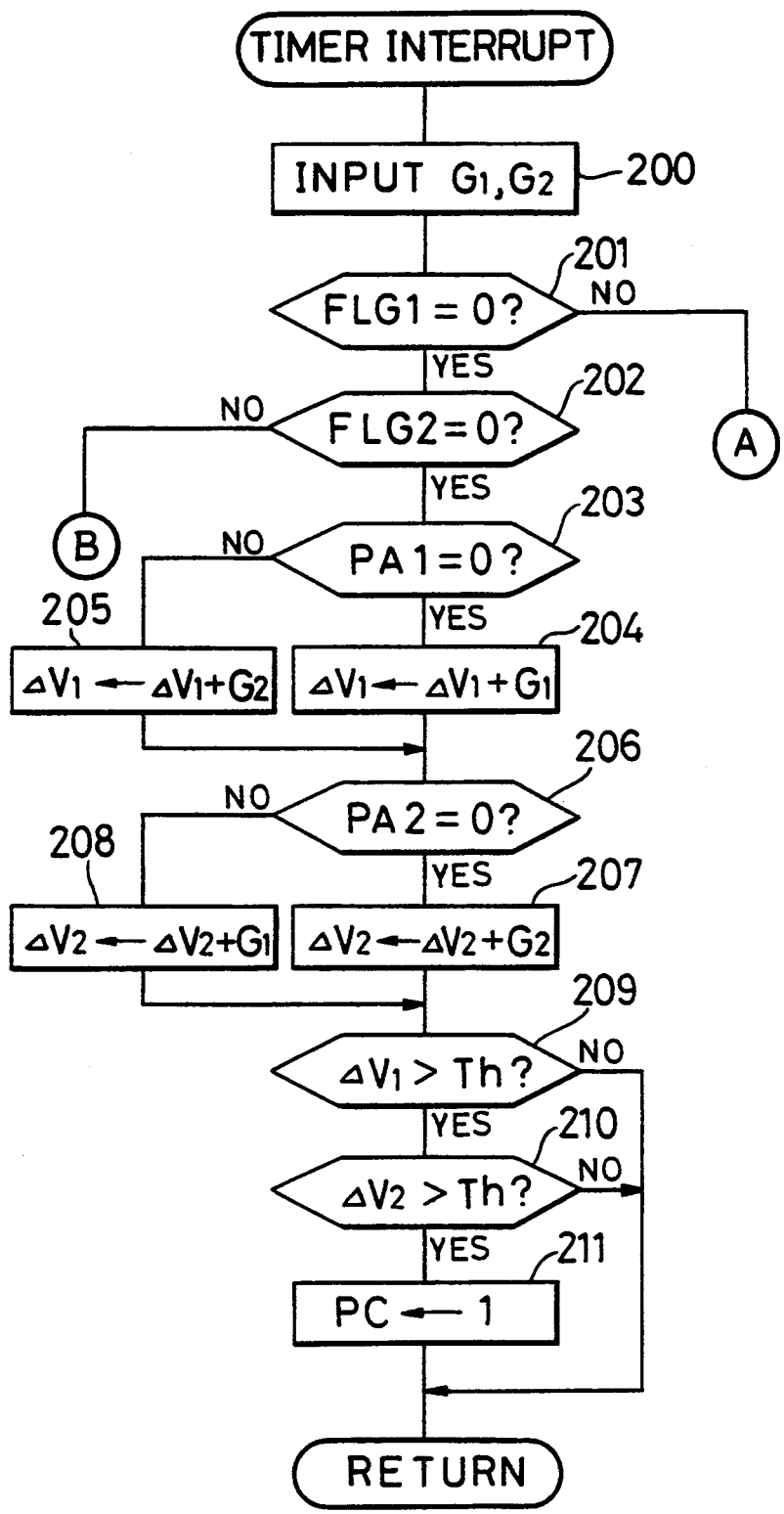
FIG. 3 is a flow chart of a main port[on of an acceleration evaluation routine executed by the microcomputer.
Figure 7:
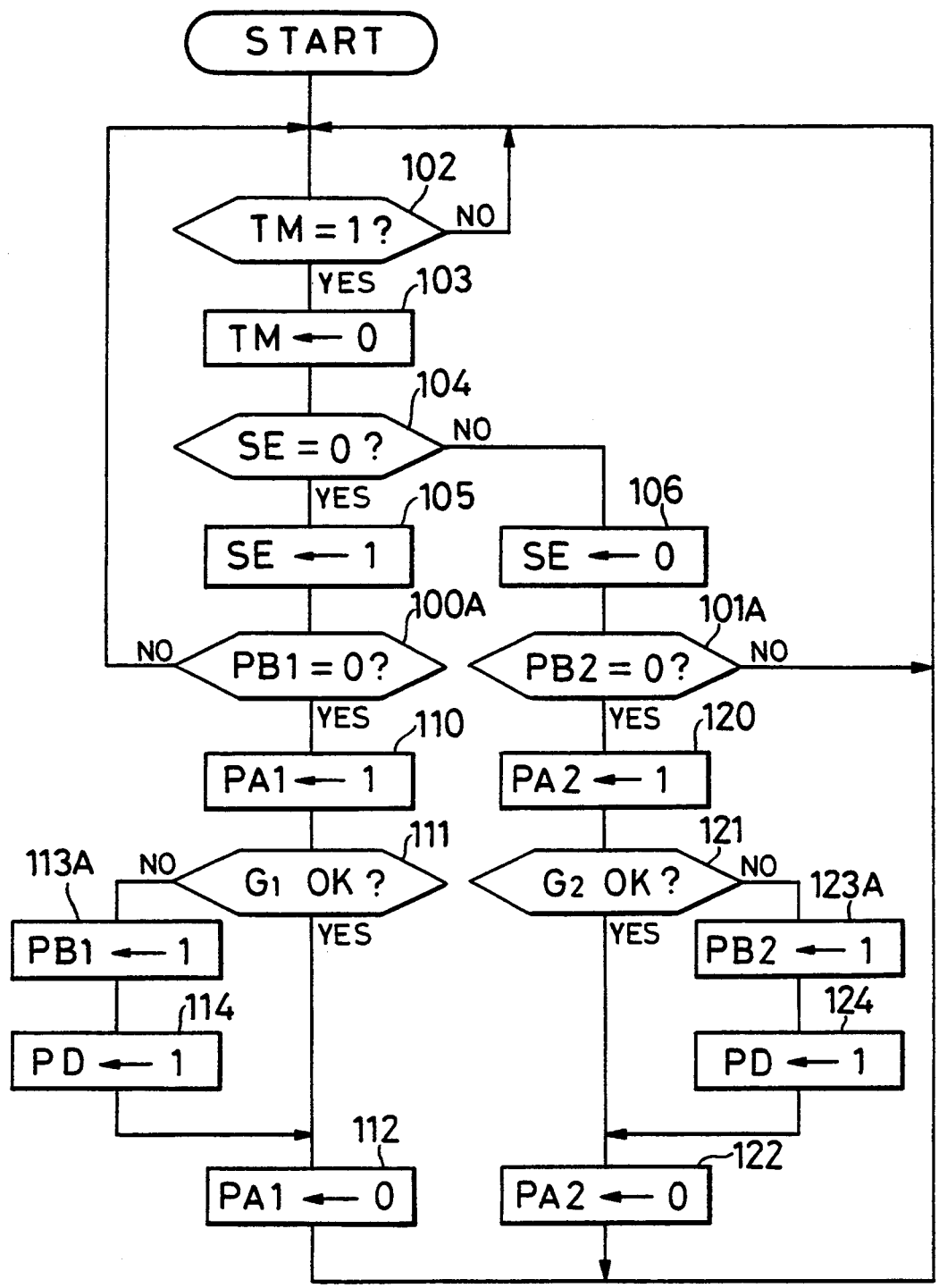
FIG. 7 is a flow chart of a failure judgment routine executed by the control system of FIG. 6.

In the embodiment of FIG. 6, a failure judgment routine of FIG. 7 is executed. More specifically, Steps 113 and 123 in FIG. 2 are replaced respectively by Steps 113A and 123A, These Steps 113A and 123A are executed respectively in accordance with the failure decisions of Steps 111 and 121, and the outputs of the PB1 and PB2 are switched from the low level to the high level, thereby outputting the failure judgment signals. Further, Steps 100 and 101 in FIG. 2 are replaced by Steps 100A and 101A, respectively. More specifically, it is judged in Step 100A next to Step 105 whether or not the output level of the output port PB1 is low. If the Judgment result in this Step 100A is "NO" (that is, the first acceleration sensor 11 is subjected to a failure), the failure judgment of the first acceleration sensor 11 from Step 110 on is not effected. Similarly, it is judged in Step 101A next to Step 106 whether or not the output level of the output port PB2 is low. If the Judgment result in this Step 101A is "NO", the failure judgment of the second acceleration sensor 12 from Step 120 on is not effected. With this arrangement, even when one of the acceleration sensors is subjected to a failure, the failure judgment of the other acceleration sensor can be effected. Those portions of FIG. 7 corresponding to those of FIG. 2 are designated by identical reference numerals. respectively, and explanation thereof is omitted. In the embodiment of FIG. 6, an acceleration evaluation routine similar to that of FIG. 3 is executed; however, instead of Steps 201 and 202 of FIG. 3 in which it is judged whether or not the failure flags FLG1 and FLG2 are in their cleared condition, there are executed Steps in which it is Judged whether or not the output levels of the output ports PB1 and PB2 are low. A Step may be added in which it is judged whether or not the output level of the output port PB2 is low, after it is judged in the above Step replacing Step 201 that the output level of the output port PB1 is high. If it is judged in this added Step that the output level of the output port PB2 is low, Steps 300 to 302 of FIG. 4 are executed, and the program returns to the main routine. In contrast, if this Judgment result is that the output level of the output port PB2 is high, Steps 300 to 302 are not executed, and the program returns to the main routine.

When the acceleration is more than 1G, the failure judgment may not be effected. Until a predetermined period of time passes after the outputting of the test pulse is stopped, it may be presumed that the acceleration sensor which has received the test pulse is still subjected to the failure judgment, and based on this presumption, the sensor signal from this acceleration sensor may not be used for the acceleration evaluation.

The test pulses may be supplied to the electrode of each acceleration sensor for outputting the voltage corresponding to the acceleration and deceleration of the vehicle.

The control system of the present invention can be applied not only to the air bag but also to a pre-tensioner of a seat belt.

What is claimed is:

1. A control system for a vehicle safety device comprising:
    (a) a plurality of acceleration sensors, each of which outputs a signal representative of acceleration and deceleration of a vehicle;
    (b) test pulse output means for outputting test pulses to said plurality of acceleration sensors so that when one of said plurality of acceleration sensors receives the test pulse, the other acceleration sensor does not receive the test pulse;
    (c) failure judgment means for checking said signal output from the acceleration sensor which received said test pulse to judge whether or not this acceleration sensor has failed; and
    (d) acceleration evaluation means for continuously calculating with the signals output from those acceleration sensors which have not received the test pulse to judge whether or not a vehicle collision has occurred, and then to output a trigger signal to a vehicle safety device which said acceleration evaluation means judges that the collision has occurred.

2. A control system as claimed in claim 1, wherein said plurality of acceleration sensors include first and second acceleration sensors,
    said acceleration evaluation means including main calculation means which calculates when said failure judgment means judges that both of said first and second acceleration sensors are normal, said main calculation means comprising:
    first and second integrating means, first and second comparison means, and trigger signal output means, wherein said first integrating means integrates a signal from said first acceleration sensor to obtain a first integral value, and adds a signal from said second acceleration sensor to said first integral value to renew said first integral value during the failure judgment of said first acceleration sensor, said second integrating means integrates said signal from said second acceleration sensor to obtain a second integral value, and adds said signal from said first acceleration sensor to said second integral value to renew said second integral value during the failure judgment of said second acceleration sensor, said first comparison means compares said first integral value with a threshold level, said second comparison means compares said second integral value with said threshold level, and said trigger signal output means outputs said trigger signal when said first comparison mans judges that said first integral means exceeds said threshold level and said second comparison means judges that said second integral value exceeds said threshold level.

3. A control system as claimed in claim 2, wherein said acceleration evaluation means further comprises first and second auxiliary calculation means, said first auxiliary calculation means integrates said signal from said first acceleration sensor when said failure judgment means judges that said second acceleration sensor has failed, compares this integral value with said threshold level, and then outputs said trigger signal when tis integral value exceeds said threshold level, and said second auxiliary calculation means integrates said signal from said second acceleration sensor when said failure judgment means judges that said first acceleration sensor has failed, compares this integral value with said threshold level, and then outputs said trigger signal when this integral value exceeds said threshold level.

4. A control system as claimed in claim 1, wherein said plurality of acceleration sensors include first and second acceleration sensors, and said test pulse output means outputs test pulses to said first and second acceleration sensors, alternately.

* * * * *

UNITED STATES PATENT AND TRADEMARK OFFICE
CERTIFICATE OF CORRECTION

PATENT NO. : 5,363,303
DATED : November 8, 1994
INVENTOR(S) : Hideyuki KANEKO and Kunihiro TAKEUCHI It is certified that error appears in the above-indentified patent and that said Letters Patent is hereby corrected as shown below:

Column 7:
 Claim 1, line 50, "which" should be --when--.
Column 8:
 Claim 2, line 29, "mans" should read --means--.

Claim 2, lines 29-30, "said first integral means" should read --said first integral value--.

Claim 3, line 40, "tis" should read --this--.

Signed and Sealed this

Twenty-seventh Day of June, 1995

Attest:

BRUCE LEHMAN

Attesting Officer        Commissioner of Patents and Trademarks